United States Patent
Dimmick et al.

(10) Patent No.: US 9,513,440 B2
(45) Date of Patent: Dec. 6, 2016

(54) ACTUATOR SYSTEMS FOR DEFLECTING OPTICAL WAVEGUIDES, AND DEVICES FOR PROCESSING OPTICAL SIGNALS COMPRISING SAME

(71) Applicant: HARRIS CORPORATION, Melbourne, FL (US)

(72) Inventors: Timothy E. Dimmick, Oviedo, FL (US); Paul B. Koeneman, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 113 days.

(21) Appl. No.: 13/751,670

(22) Filed: Jan. 28, 2013

(65) Prior Publication Data

US 2014/0212089 A1    Jul. 31, 2014

(51) Int. Cl.
| G02B 6/26 | (2006.01) |
|---|---|
| G02B 6/14 | (2006.01) |
| G02B 6/35 | (2006.01) |
| G02B 6/24 | (2006.01) |
| G02B 6/293 | (2006.01) |
| G02B 6/28 | (2006.01) |

(52) U.S. Cl.
CPC . *G02B 6/26* (2013.01); *G02B 6/14* (2013.01); *G02B 6/24* (2013.01); *G02B 6/2835* (2013.01); *G02B 6/29395* (2013.01); *G02B 6/3504* (2013.01); *G02B 6/3578* (2013.01)

(58) Field of Classification Search
None
See application file for complete search history.

(56) References Cited

U.S. PATENT DOCUMENTS

| 4,725,124 | A | * | 2/1988 | Taylor | 385/4 |
|---|---|---|---|---|---|
| 5,058,977 | A | | 10/1991 | Sorin | |
| 5,166,992 | A | * | 11/1992 | Cassidy et al. | 385/24 |
| 5,295,205 | A | * | 3/1994 | Miller et al. | 385/1 |
| 5,321,777 | A | * | 6/1994 | Hicks et al. | 385/4 |
| 5,353,363 | A | * | 10/1994 | Keck et al. | 385/46 |
| 5,875,272 | A | | 2/1999 | Kewitsch et al. | |
| 5,915,050 | A | | 6/1999 | Russell et al. | |
| 5,999,671 | A | | 12/1999 | Jin et al. | |
| 6,088,495 | A | | 7/2000 | Vorobeichik et al. | |
| 6,321,022 | B1 | * | 11/2001 | DeBoynton | 385/140 |
| 6,434,287 | B1 | * | 8/2002 | Leyva et al. | 385/16 |
| 6,628,861 | B1 | | 9/2003 | Yao | |
| 6,751,377 | B2 | * | 6/2004 | Baumann et al. | 385/32 |
| 6,768,750 | B2 | * | 7/2004 | Kuksenkov | 372/20 |
| 7,218,814 | B2 | | 5/2007 | Vorobeichik et al. | |

(Continued)

OTHER PUBLICATIONS

Park, H.C., et al., "Apodization of an Elliptic-Core Two-Mode Fiber Acousto-Optic Tunable Filter," OFC4, copyright 2005 Optical Society of America, OSA/OFC 2005.

(Continued)

*Primary Examiner* — Mike Stahl
(74) *Attorney, Agent, or Firm* — Fox Rothschild LLP; Robert J. Sacco; Carol E. Thorstad-Forsyth

(57) ABSTRACT

Actuator systems (10) are provided for inducing one or more static deflections, such as bends, in optical waveguides (12), to alter spectral characteristics of an optical signal transmitted through the waveguide. The actuator systems (10) can include actuators (28) that deflect the waveguide (12), and a controller (40) that controls the actuators (28) so that the deflections in the waveguide (12) are tailored to produce desired spectral characteristics in the optical signal. The actuator systems (10) can be used in conjunction with, for example, a fused fiber optic coupler (12) to form a wavelength selective switch. The actuator systems (10) can be used in conjunction with other types of waveguides to form other types of optical signal processors (14).

20 Claims, 16 Drawing Sheets

(56) References Cited

U.S. PATENT DOCUMENTS

| | | |
|---|---|---|
| 7,477,812 B2 | 1/2009 | Nielson et al. |
| 2003/0123787 A1* | 7/2003 | Bona et al. ............... 385/17 |
| 2003/0138190 A1* | 7/2003 | Tabata ..................... 385/16 |
| 2003/0185492 A1 | 10/2003 | Bucker et al. |
| 2006/0034566 A1* | 2/2006 | Wakita et al. ........... 385/31 |
| 2011/0318003 A1* | 12/2011 | Brooks .................... 398/45 |

OTHER PUBLICATIONS

Yeom, D.I., et al., "Narrow-Bandwidth Acousto-Optic Tunable Filter with Low Polarization Dependence," OFC3, aopyright 2005 Optical Society of America, OSA/OFC.

Song, G.H., "Toward the Ideal Codirectional Bragg Filter with an Acousto-Optic-Filter Design," Journal of Lightwave Technology, vol. 13, No. 3, Mar. 1995, 0733-8724/95, copyright IEEE.

Winick, K., "Design of Grating-Assisted Waveguide Couplers with Weighted Coupling," Journal of Lightwave Technology, vol. 9, No. 11, Nov. 1991, 0733-8724/91/1100-1481 copyright 1991 IEEE.

Brenne, J.K., et al., "Design of Grating-Assisted Codirectional Couplers with Discrete Inverse-Scattering Algorithms," Journal of Lightwave Technology, vol. 21, No. 1, Jan. 2003, 0733-8724/03, copyright IEEE.

Birks, T.A., et al., "The Acousto-Optic Effect in Single-Mode Fiber Tapers and Couplers," Journal of Lightwave Technology, vol. 14, No. 11, Nov. 1996, 0733-8724/96, copyright 1996 IEEE.

\* cited by examiner

ACTUATOR SYSTEMS FOR DEFLECTING OPTICAL WAVEGUIDES, AND DEVICES FOR PROCESSING OPTICAL SIGNALS COMPRISING SAME

BACKGROUND OF THE INVENTION

Statement of the Technical Field

The inventive arrangements relate generally to devices for processing optical signals, such as but not limited to wavelength selective switches and filters. More specifically, the inventive arrangements relate to actuator systems that induce static deflections, such as bends, in optical waveguides, to alter the spectral characteristics of optical signals transmitted through the waveguides.

Description of the Related Art

Providers of fiber-optic networks face a constant demand to increase network capacity. This demand results in a need for increased spectral utilization and dynamic reconfigurability in fiber optic networks. Wavelength division multiplexing, using wavelength selective switching devices such as reconfigurable optical add-drop multiplexers (ROADMs), is one commonly-used way to meet these requirements. The losses in optical power associated with these types of devices, however, are relatively high, e.g., 6-8 dB. Although optical amplifiers can be used to compensate for such losses, the use of optical amplifiers can adversely affect the optical signal to noise ratio, which imposes a practical limitation on length and capacities of the optical pathways within the networks.

All-fiber wavelength selective switches have been developed. These switches operate via propagation mode coupling in waveguides such as multimode or tapered optical fibers, and fused fiber optic couplers. The mode coupling is accomplished by subjecting the waveguide to an acoustically-induced traveling flexural wave.

All-fiber wavelength selective switches, in general, have favorable, i.e., relatively low, power losses. It is difficult to obtain a desired spectral response in such switches, however, because the amplitude and phase of the traveling flexural wave cannot be controlled within the interaction region of the waveguide. Moreover, the traveling flexural wave imparts a frequency shift to the coupled light. This frequency shift can result in undesirable amplitude modulation of both the through and switched optical waves.

Optical amplifiers are ubiquitous in modern fiber optic networks. Long haul dense wavelength division multiplexed (DWDM) networks require optical amplifiers with performance (gain and noise figure) that is uniform across a broad wavelength range. This is typically achieved by incorporating spectral equalizing filters within the optical amplifier. These filters provide loss that varies with wavelength to compensate for the wavelength dependent gain of the amplifier. Typical low loss equalizing filters have a fixed response (they cannot be adjusted after fabrication). This lack of adjustability is a limitation as the wavelength dependence of an optical amplifier gain typically varies as a function of the number, power and wavelength of the DWDM channels input to the amplifier.

Dynamic spectral equalizing filters have been developed but these devices rely on the same technologies employed by the previously described wavelength selective switches and also suffer the same limitations.

SUMMARY OF THE INVENTION

Actuator systems are provided for inducing one or more static deflections, such as bends, in optical waveguides, to alter spectral characteristics of an optical signal transmitted through the waveguide. The actuator systems include actuators that deflect the waveguide, and a controller that controls the actuators so that the deflections in the waveguide are tailored to produce desired spectral characteristics in the optical signal. The actuator systems can be used in conjunction with, for example, a fused fiber optic coupler to form a wavelength selective switch. As another example, the actuator systems can be used with a single mode fiber, tapered single mode fiber or etched single mode fiber to form a dynamically reconfigurable spectral equalizing filter useful in optically amplified fiber optic networks. The actuator systems can also be used in conjunction with the aforementioned and other types of waveguides to form other types of signal processing devices such as band stop and band pass filters.

Systems for processing optical signals comprise an optical waveguide, a voltage source, and a deflector device configured to statically deflect the waveguide. The deflector device can be, for example, a plurality of positioning elements that each include an actuator such as a piezoelectric, thermal, pneumatic, hydraulic, magnetic, or electrostatic actuator. The deflector device is electrically connected to the voltage source and is responsive to a voltage applied thereto by the voltage source. The systems also comprise a controller communicatively coupled to the voltage source. The controller is operative to control the voltage supplied to the deflector devices.

Actuator systems for use with optical waveguides comprise a voltage source and a plurality of positioning elements. Each of the positioning elements comprises an actuator. The actuator is electrically connected to the voltage source, and operates to statically deflect the optical waveguide in proportion to a voltage provided to the actuator by the voltage source. The systems also comprise a controller communicatively coupled to the one or more voltage sources and operating to vary the voltage provided to each of the actuators to thereby control the static deflection of the optical waveguide.

Systems for modifying optical signals include an optical waveguide for transmitting the optical signal and an actuator system comprising a plurality of positioning elements located proximate the waveguide. The positioning elements each have an actuator that operates to cause a static deflection in the waveguide. The static deflection alters a spectral response of the waveguide.

Methods for altering spectral characteristics of an optical signal being transmitted through a waveguide include inducing one or more static deflections, such as bends, in the waveguide to, for example, couple propagation modes in the waveguide. The methods can also include providing an actuator system comprising actuators operative to induce the deflections, and a controller operative to control the actuators so that the deflections are tailored to produce desired spectral characteristics in the optical signal.

BRIEF DESCRIPTION OF THE DRAWINGS

Embodiments will be described with reference to the following drawing figures, in which like numerals represent like items throughout the figures and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention FIGS. 1-5A depict an actuator system 10. The actuator system 10 is used in conjunction with an optical waveguide 12 to form an optical signal processor 14, shown in FIGS. 1-4. The optical waveguide 12 may assume various forms such as: a fused coupler formed from two optical fibers that have been fused together, as depicted in FIGS. 1-5; a tapered optical fiber; an etched optical fiber; an multi-mode optical fiber; a single-mode optical fiber, etc. The optical waveguide is depicted in the figures as a fused coupler for exemplary purposes only, and the depiction of the optical waveguide 12 in this manner is not intended to in any way limit the scope of the appended claims.

Figure 3:
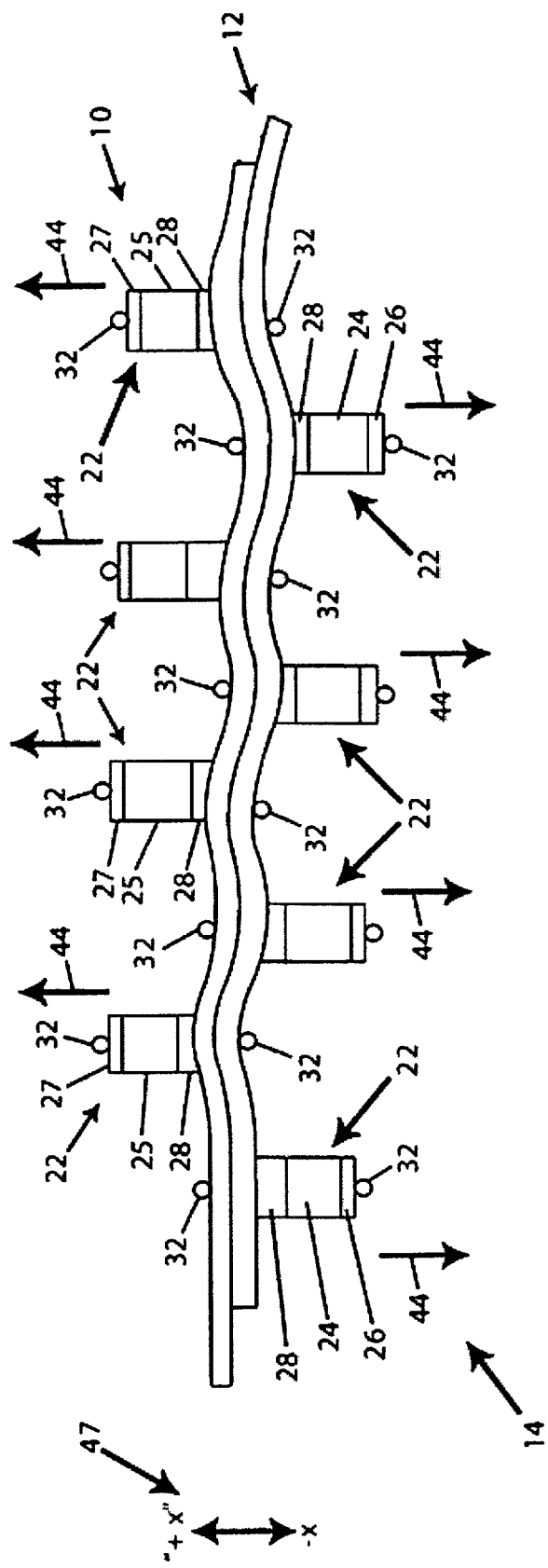
FIG. 3 is a top view of an optical signal processor shown in FIGS. 1 and 2, with the positioning elements in an energized, deflected state.

The actuator system 10 comprises a plurality of deflector devices in the form of positioning elements 20. The positioning elements 20, when activated, undergo a displacement in relation to each other, so as to induce a series of static bends in the optical waveguide 12 as shown in FIG. 3. The respective amplitudes and period of the bends can be controlled by varying the displacement of the individual positioning elements 20. The bends affect the spectral characteristics of the optical waveguide 12. For example, the bends can alter the pass band and stop bands of the optical waveguide 12. The spectral characteristics of the optical waveguide 12 can thus be controlled by controlling the relative displacements of the positioning elements 20.

The term "static," as used in the specification and claims to describe the bends and other deflections imposed by the actuator system 10 on the optical waveguide 12, is intended to denote deflections that are maintained at a particular location on the waveguide on a steady-state basis, i.e., for a finite amount of time, as opposed to deflections, such as a traveling flexural wave, that are imposed on a transient or continually-varying basis.

Figure 2:
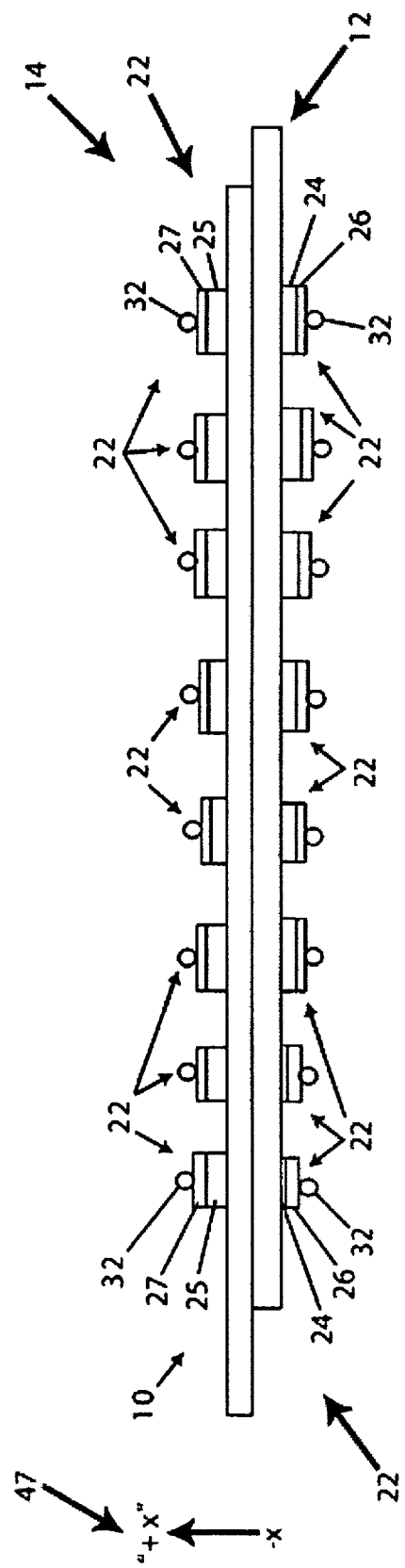
FIG. 2 is a top view of the optical signal processor shown in FIG. 1, with the positioning elements in a non-energized, un-deflected state.
Figure 4:
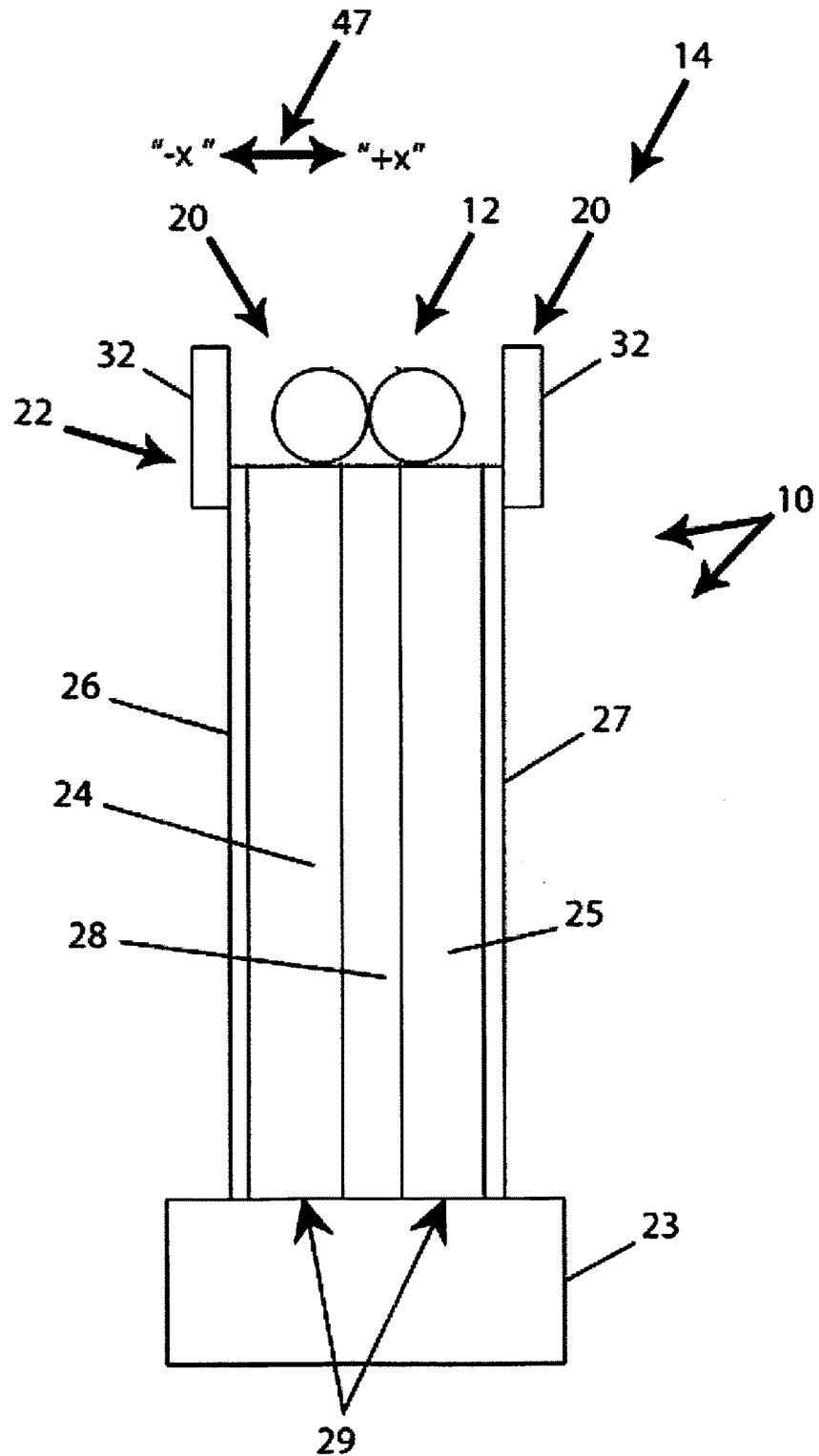
FIG. 4 is a side view of the optical signal processor shown in FIGS. 1-3, with the positioning elements in a non-energized, un-deflected state.

The actuator system 10 can include a bank 22 of the positioning elements 20, as shown in FIGS. 2-4. The bank 22 can include eight of the positioning elements 20. The number of positioning elements 20 in the bank 22 is application dependent, and can vary with factors such as the desired spectral characteristics of the optical signal processor 14, the overall length of the optical waveguide 12, the period and maximum amplitude of the bends, etc. For example, hundreds or thousands of positioning elements can be used to implement single-channel wavelength selective switching in DWDM transmission systems.

The actuator system 10 can also include a base 23. A lower portion of the bank 22 of positioning elements 20 is positioned within, and restrained by the base 23. The base 23 can be formed from a suitable electrically-insulative material such as plastic. The base is not depicted in FIG. 2 or 3, for clarity of illustration.

Each positioning element 20 includes a piezoelectric actuator 29. The piezoelectric actuator 29 comprises a metallic inner layer 28, and two layers 24, 25 of piezoelectric material disposed on opposite sides of the inner layer 28 as depicted in FIG. 4. The piezoelectric actuator 29 further comprises a metallic outer layer 26 disposed on an outwardly-facing side of the piezoelectric layer 24, and another metallic outer layer 27 disposed on an outwardly-facing side of the piezoelectric layer 25. The use of a piezoelectric-type actuator is disclosed for exemplary purposes only. Thermal, pneumatic, hydraulic, magnetic, electrostatic, and other types of actuators can be used in alternative embodiments.

Figure 1:
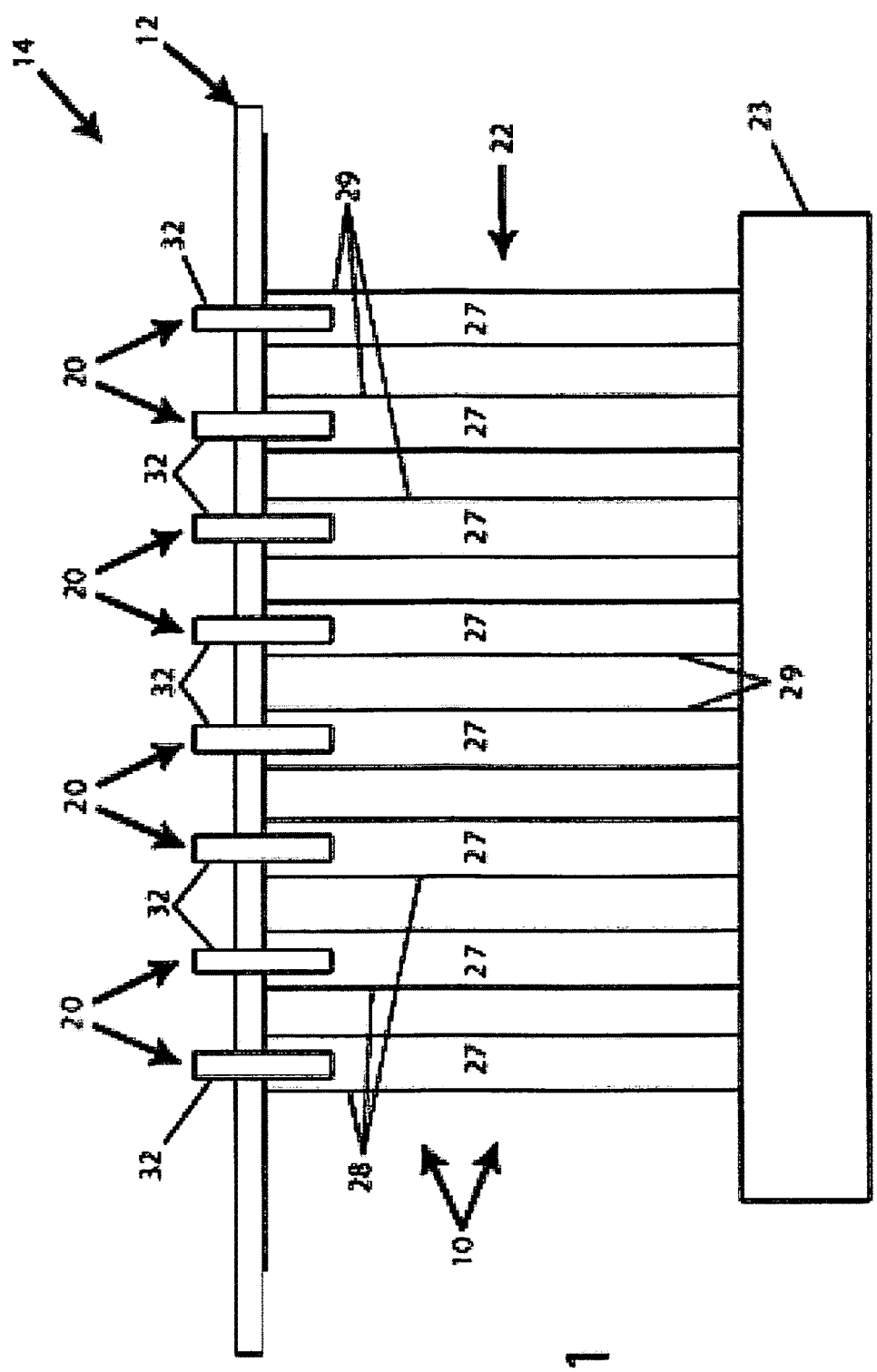
FIG. 1 is a front view of an optical signal processor, with positioning elements of an actuator system of the optical signal processor in a non-energized, un-deflected state, and depicting an optical waveguide of the optical signal processor as a fused coupler for illustrative purposes only.
Figure 1A:
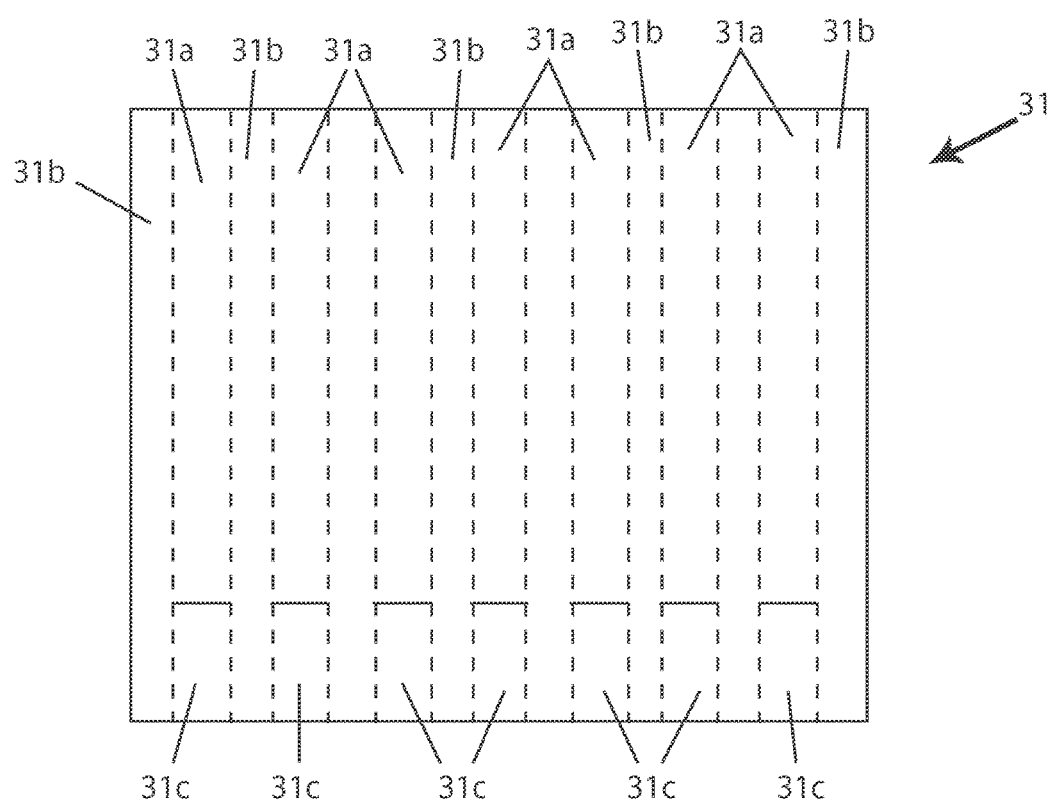
FIG. 1A is a side view of a bimorph plate from which a bank of positioning elements of the actuator system shown in FIG. 1 is formed.

The bank 22 of positioning elements 20 is formed from a piece of bimorph plate 31 comprising a metallic inner layer, and two layers of a piezoelectric material bonded to opposite sides of the metallic inner layer by a suitable means such as an electrically conductive adhesive or solder. The piezoelectric layers are oriented so that the polarities thereof are aligned. In alternative embodiments, the piezoelectric layers can be oriented so that the polarities thereof are reversed. The bimorph plate further comprises two metallic outer layers. Each outer layer is disposed on an outwardly-facing surface of a respective one of the piezoelectric layers. FIG. 1A is a side view of the bimorph plate 31, in which one of the outer metallic layers is visible.

The bank 22 is formed by removing portions of the bimorph plate 31. In particular, rectangular sections 31a of the bimorph plate 31 can be removed at equally-spaced intervals along the length of the bimorph plate 31 as illustrated in FIG. 1A, to form a series of spaced apart, upwardly-extending fingers 31b that make up the piezoelectric actuators 29. The sections 31a can be removed by a suitable means such as sawing. The metallic inner layer 28 of each actuator 29 is formed by portions of the inner metallic layer of the bimorph plate 31 that remain after the sections 31a have been removed. The piezoelectric layers 24, 25 of each actuator 29 are formed by remaining portions of the piezoelectric layers of the bimorph plate 31. The metallic outer layers 26, 27 of each actuator 29 are formed by remaining portions of the metallic outer layers of the bimorph plate 31.

As shown in FIG. 1A, the sections 31a removed from the bimorph plate 31 do not extend to the bottom of the bimorph plate 31, i.e., the removal of the sections 31a does not affect the lowermost portion of the bimorph plate 31. Following removal of the sections 31a, sections 31c of the outer metallic layers of the bimorph plate 31 are selectively removed by a suitable means such as etching. The sections 31c are located directly below the spaces between the actuators 29 created by the removal of the section 31a. The removal of the sections 31c electrically isolates the metallic outer layers 26, 27 of adjacent actuators 29. (Because the sections 31a removed from the bimorph plate 31 extend over only a portion of the height of the bimorph plate 31, the metallic inner layers 28 of the individual actuators 29 remain in electrical contact with reach other.)

Each positioning element 20 also includes a contact portion 32. The contact portion 32 can be, for example, rigid glass rods that are fixedly coupled to the outer layers 26, 27 of the associated piezoelectric actuator 29 by a suitable means such as adhesive. The term "coupled," as used in the specification and claims, is intended to denote both direct and indirect connections between two or more parts or components.

The optical waveguide 12 is positioned between the contact portions 32 of the bank 22, as shown in FIGS. 1-4. As can be seen in FIGS. 2 and 3, the two contact portions 32 of each positioning element 20 are disposed on opposite sides of the optical waveguide 12 and at the axial position on the waveguide 12. The contact portions 32 contact and bend the optical waveguide 12 during operation of the actuator system 10, in response to deflection of corresponding piezoelectric actuator 29, as shown in FIG. 3.

The use of rigid glass rods as the contact portions 32 of the positioning elements 20 is disclosed for exemplary purposes only. Rods and other types of structures, formed from other materials suitable for contacting the optical waveguide 12, can be used in the alternative. Moreover, the tip of each contact portion 32 can be etched, so as to reduce the contact length and best match the dimensions of the optical waveguide 12, in alternative embodiments. In other alternative embodiments, the positioning elements 20 can be configured without any contact portions 32, and the piezoelectric actuators 29, and variants thereof, can be configured to contact directly with the optical waveguide 12.

Each contact portion 32 can be formed from a material, such as a fluorinated material, having an index of refraction lower than that of the optical waveguide 12 to help minimize optical-power losses at the interface between the contact portion 32 and the optical waveguide 12. Power losses can also be reduced through the use of contact portions 32 having low absorption at the desired operating wavelength of the optical signal processor.

In applications such as the actuator system 10 where the contact portions 32 are in intermittent contact with the optical waveguide 12, the contact portions 32 should be formed from a material that is softer than the material from which the optical waveguide 12 is formed, to minimize the potential for wear and other damage to the optical waveguide 12 resulting from repeated contact with the contact portions 32.

The amplitude of the optical field in certain embodiments of the optical waveguide 12 such as a tapered optical fiber or a fused fiber coupler can be relatively high at the outer periphery of the optical waveguide 12. Thus, in applications where the actuator system 10 is used in conjunction with an optical waveguide comprising one or more tapered optical fibers, the contact area between the optical waveguide 12 and the contact portion 32 of the positioning element 20 can be minimized to help reduce optical losses at the interface between the contact portion 32 and the optical waveguide 12.

Figure 5:
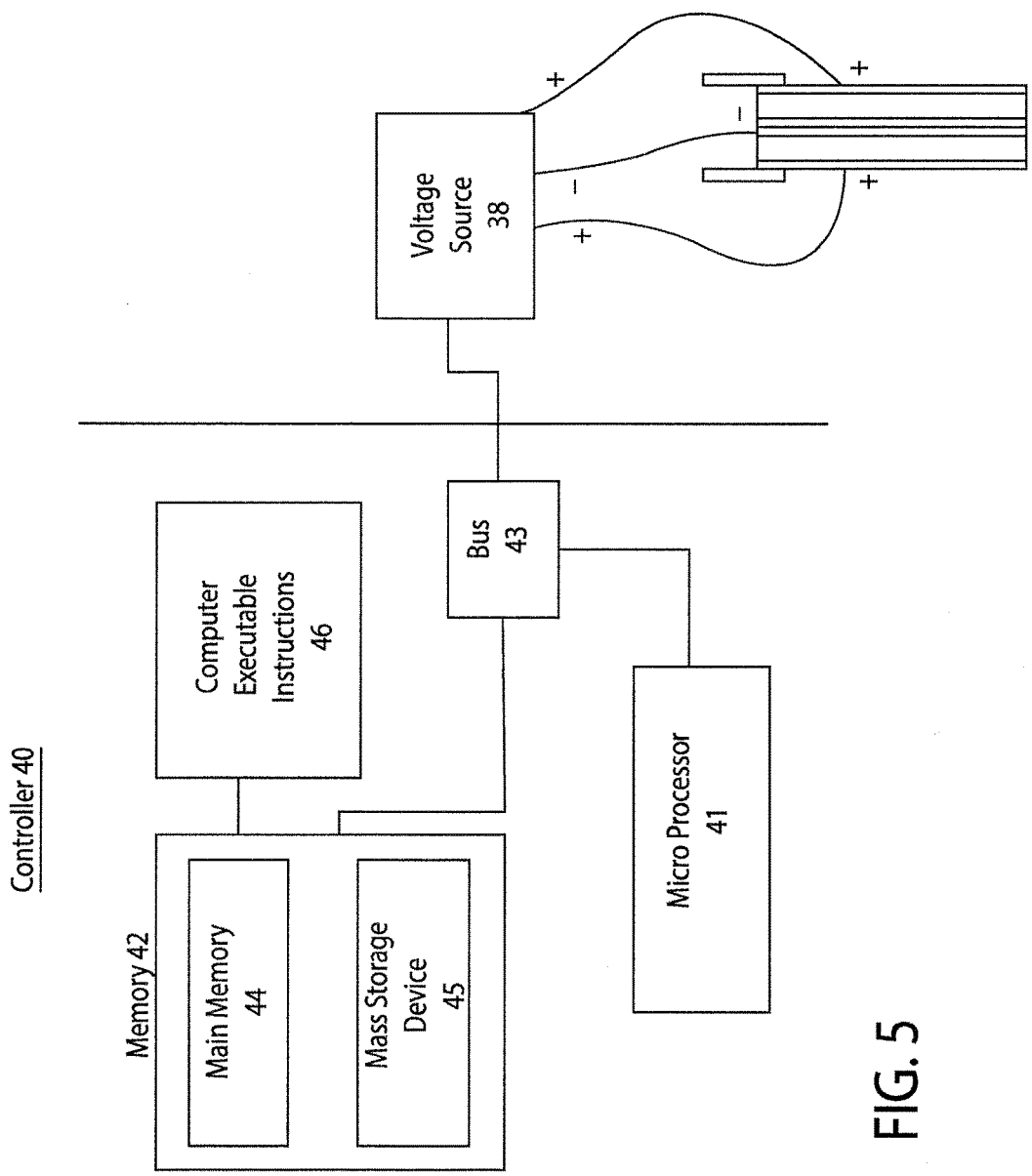
FIG. 5 is a block diagram depicting various electrical components of the actuator system of the optical signal processor shown in FIGS. 1-4.
Figure 5A:
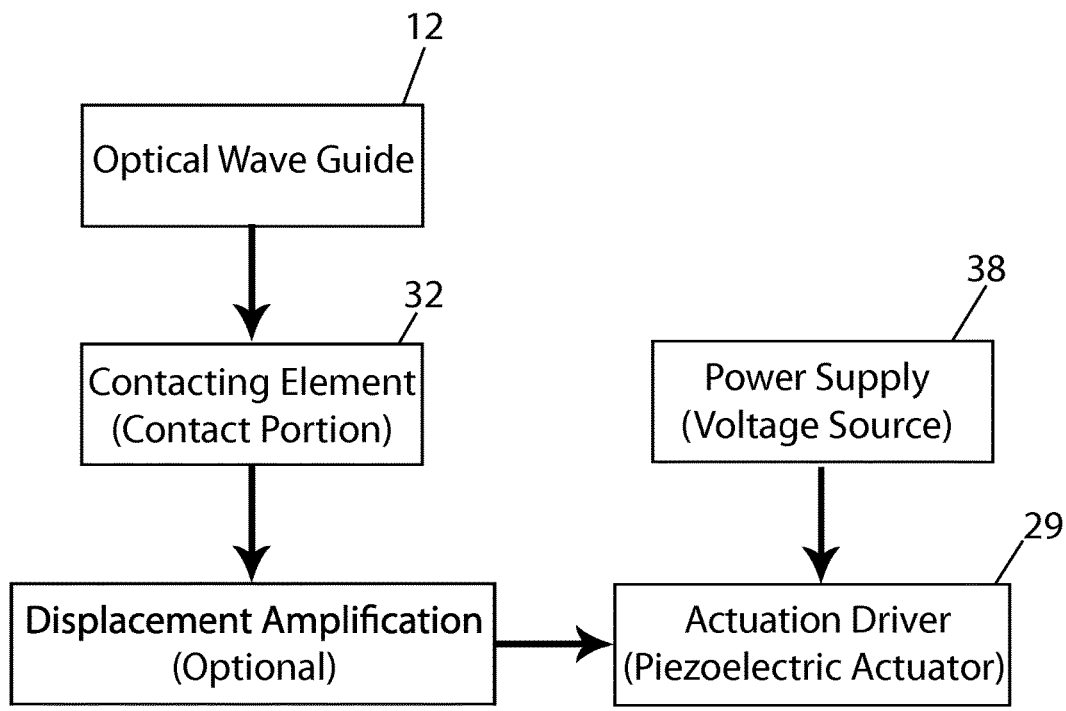
FIG. 5A is a block diagram depicting various electrical and mechanical components of the optical signal processor shown in FIGS. 1-5.

Each piezoelectric actuator 29 is energized by a voltage source 38, depicted in FIGS. 5 and 5A. The metallic outer layers 26, 27 of each actuator 29 are electrically connected to one side of the voltage source 38, and the metallic inner layer 28 of the actuator 29 is electrically connected to the other side of the voltage source 38. As discussed below, subjecting the actuator 29 to a voltage potential causes the actuator 29 to deflect, which in turn imparts a corresponding deflection to the portion of the waveguide located proximate the actuator 29. The direction of the deflection of the actuator 29 is determined by the polarity of the voltage source 38 and the magnitude of the deflection is determined by the magnitude of the voltage supplied by the voltage source 38

The voltage source 38 can be, for example, a 300 volt direct-current power supply. Other types of voltage sources can be used in the alternative. For example, for piezoelectric and electrostatic actuators, the voltage source 38 may need to supply tens to hundreds of volts and milliamps of current, while for thermal and magnetic actuators, the voltage source 38 may only need to provide single-digit voltages and single-digit currents. The voltage source 38 is capable of providing a variable, bipolar voltage to each of the positioning elements 20 on an individual basis. Multiple individual voltage sources, each associated with a particular one of the positioning elements 20, can be used in the alternative. The term "voltage source," as used in the specification and claims, is intended to denote a single voltage source as well as multiple individual voltage sources.

The actuator system 10 can also include a controller 40 that is communicatively coupled to the voltage source 38 as shown in FIG. 5. The controller 40 can control the voltage level supplied by the voltage source 38 to the piezoelectric actuator 29 of each positioning element 20 on an individual basis.

The controller 40 can include a processor such as a microprocessor 41, a memory 42, and a bus 43, shown in FIG. 5. The bus 43 facilitates internal communication between the microprocessor 41 and the memory 42, and external communication with the voltage source 38.

The memory 42 can comprise a main memory 44 and a mass storage device 45, each of which is communicatively coupled to the microprocessor 41 by way of the bus 43. The main memory 44 can be, for example, random access memory. The mass storage device 45 can be, for example, a hard or optical disk.

The controller 40 can also include computer-executable instructions 46 stored on the memory 43, as shown in FIG. 5. The computer-executable instructions 46, when executed on the microprocessor 41, cause the microprocessor 41 to generate control inputs for the voltage source 38. The control inputs cause the voltage source 38 to provide a specific voltage to one or more of the positioning elements 20, on an individual basis.

Each positioning element 20, when subjected to a voltage from the voltage source 38, undergoes a displacement due to the piezoelectric bimorph configuration of the piezoelectric actuators 29. In particular, the outer and inner layers 26, 27 of each piezoelectric actuator 29 act as electrodes when the positioning element 20 is energized. The resulting electric field causes the piezoelectric layers 24, 25 to undergo a strain along their respective longitudinal axes. Because the lower ends of the piezoelectric layers 24, 25 are restrained, the induced strain causes the piezoelectric layers 24, 25 to bend, which in turn causes the upper or freestanding end of each piezoelectric layer 24, 25 to move substantially to the left or right from the perspective of FIG. 4, i.e., in the "+x" or "−x" direction denoted in FIGS. 2-4. Moreover, the alignment of the polarities of the piezoelectric layers 24, 25 causes the piezoelectric layers 24, 25 to deflect in the same direction. The deflection of the piezoelectric layers 24, 25 results in a corresponding deflection in the piezoelectric actuator 29, which in turn drives one of the attached contact portions 32 toward, and into contact with the optical waveguide 12, as denoted by the arrows 44 in FIG. 3.

Further displacement of the contact portion 32 once the contact portion 32 contacts the optical waveguide 12 causes a corresponding localized displacement in the optical waveguide 12, in a direction substantially perpendicular to the longitudinal axes of the optical waveguide 12, i.e., in the "+x" or "−x" direction. FIG. 5A is a block diagram depicting the various components that induce the noted movement in the optical waveguide 12. FIG. 5A also depicts an optional means for amplifying the displacement of the piezoelectric actuator 29.

The controller 40 can control the operation of the individual positioning elements 20 so that the positioning elements 20 induce static undulations or "microbends" in the optical waveguide 12. In particular, the controller 40 can activate or energize the positioning elements 20 so that a positioning element 20 receives a positive voltage that results in a "+x" displacement. At the same time, the controller 40 can energize the positioning elements 20 adjacent to, i.e., to the immediate left and right from the perspective of FIGS. 2 and 3, of the aforementioned activated positioning element 20 by applying a negative voltage that results in a "−x" displacement, thereby inducing a bend in the optical waveguide 12 as shown in FIG. 3.

The direction of the bending or displacement of the positioning elements 20 is dependent upon the polarity of the voltage applied thereto. The magnitude of the bending or displacement is proportional to the voltage applied thereto. Thus, the direction and magnitude of the individual bends in the optical waveguide 12 can be controlled, via the controller 40, by controlling the magnitude and polarity of the voltage supplied to each positioning element 20 by the voltage source 38. In particular, the static microbend at each lengthwise location along the optical waveguide 12 can be effectuated by energizing the piezoelectric actuator 29 of the positioning element 20 associated with that location, and tailoring the applied voltage to a sign, i.e., polarity, and a level that causes the piezoelectric actuator 29 to bend so as to produce the desired localized deflection in the optical waveguide 12. The computer executable instructions 46 in the controller 40 can be configured so that the controller 40 tailors the voltage level supplied to each of the positioning elements 20 in such a manner that the positioning elements 20 work in conjunction with each other to produce a series of microbends of the desired period and amplitude in the optical waveguide 12.

The static microbends in the optical waveguide 12 can alter the spectral response of the optical waveguide 12 by coupling propagation modes of the optical waveguide 12. Coupling between propagation modes can occur when the period of the microbend matches the beat length between the propagation modes being coupled. The beat length $L_B$ can be calculated as follows:

$$L_B = \lambda / |n_1 - n_2|$$

Where $\lambda$ is the wavelength of the optical signal through the optical waveguide 12 and $|n_1 - n_2|$ equals the absolute value of the difference between the effective index of refraction of the propagation modes that are being coupled. Thus, in order to achieve coupling between propagation modes, adjacent pairs of the contact portions 32 should spaced apart in the lengthwise direction of the bank 22 by a distance less than or equal to one-half of the shortest beat length between the propagation modes that are being coupled. The period of the microbend formed in the optical waveguide can then take any value greater than twice the distance between adjacent pairs of contact portions 32 by appropriate selection of the magnitude and polarity of the voltage applied to the individual positioning elements 20. For example, the optical wavelength of a wavelength selective switch can thereby be adjusted by altering the period of the microbends formed in the optical waveguide.

The ability to couple propagation modes in the optical waveguide 12 can be used to synthesize a specific desired spectral response in the optical waveguide 12. For example, FIG. 6 shows the spectral response that theoretically can be achieved in an optical signal processor, provided the amplitude of the coupling coefficient between modes can be made to vary along the length of the coupling region as indicated in FIG. 7.

Figure 6:
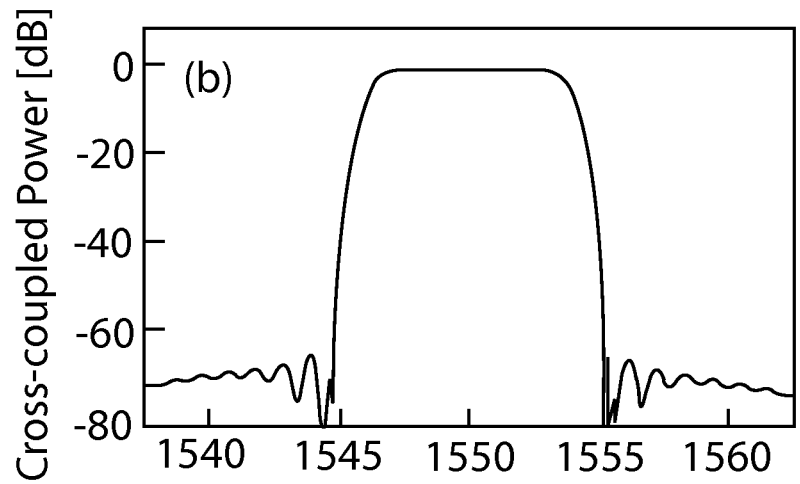
FIG. 6 is a graphical depiction of the spectral characteristics of an optical signal that has been processed by an optical signal processor similar to the optical signal processor shown in FIGS. 1-5A.
Figure 7:
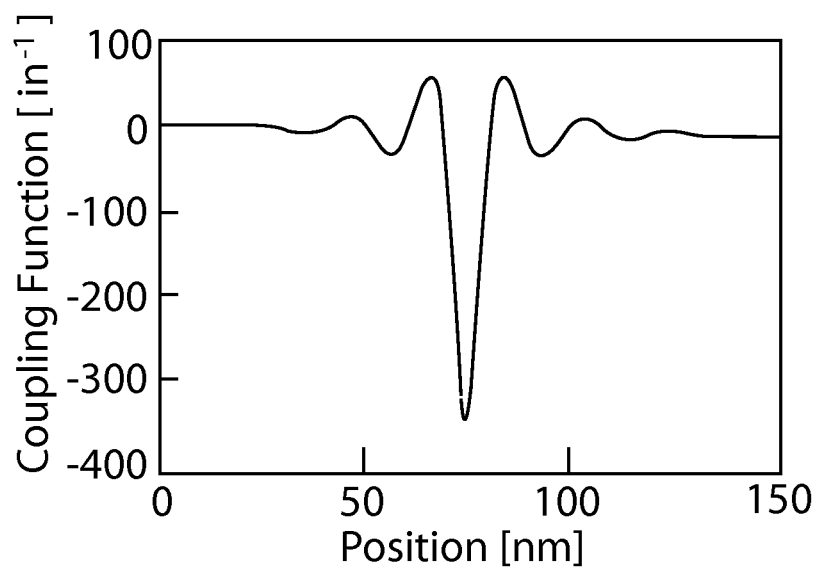
FIG. 7 is a graphical representation of the coupling coefficient between two modes of the waveguide of the optical signal processor referred to in FIG. 6, induced by the actuator system of the optical signal processor of FIGS. 1-4, to produce the spectral characteristics depicted in FIG. 6.

FIGS. 6 and 7 are excerpted from the following source: Brenne, Skaar, "Design of Grating-Assisted Codirectional Couplers with Discrete Inverse-Scattering Algorithms," Journal of Lightwave Technology Vol. 21, No. 1, January 2003, in which the authors describe a method for synthesizing a desired spectral response in an optical coupler by varying the coupling coefficient between the modes in a prescribed way. FIG. 6 is the resultant spectrum obtained from the coupling coefficient function shown in FIG. 7. The amplitude of the coupling coefficient between modes is proportional to the magnitude of the deflection of the optical waveguide 12 (see Birks, et. al. "The Acousto-Optic Effect in Single-Mode Fiber Tapers and Couplers," Journal of Lightwave Technology Vol 14, No. 11, November 1996). It is believed that the coupling coefficient function shown in FIG. 7 can be produced by an actuator system substantially the same as, or similar to the actuator system 10, provided the actuator system has a sufficient number of positioning elements 20 to introduce the series of arbitrary-amplitude microbends that make up the coupling coefficient function. The number of positioning elements 20 required to synthesize a particular spectral response is related to the fractional bandwidth desired, and the design of the optical waveguide 12.

FIG. 6 demonstrates the characteristics of a relatively flat passband, a relatively high stopband rejection, and relatively low or suppressed side lobes between the passband and stopbands that are desirable in a wavelength selective switch for telecom applications, and in other types of optical signal processors. As discussed above, it is believed that these characteristics can be achieved through the use of the actuator system 10 and alternative embodiments thereof. Moreover, because a wavelength selective switch or other optical signal processors configured in this manner is an "all-fiber" switch, i.e., the optical signal remains within optical fibers throughout the switch, the switch or device produces these desirable spectral characteristics with the relatively low power losses associated with all-fiber switches.

The use of the actuator system 10 in conjunction with an optical signal processor 14 configured as a wavelength selective switch comprising a fused fiber optic coupler as the optical waveguide 12 is disclosed for exemplary purposes only. The actuator system 10, and variants thereof, can be used to induce static bends and other types of deformations in other types of waveguides to perform other useful functions such as an optical band-stop filter or dynamic equalizing filter. For example, the actuator system 10 can be used to induce microbends in multi-mode optical fibers, and in the waist of a tapered optical fiber so as to couple the modes of the waist. The actuator system 10 can also be used to induce microbends in single-mode optical fibers and single-mode optical fibers with etched cladding so as to couple the core and cladding modes of those optical fibers. These configurations are useful in realizing two-port optical devices such as a band stop filter or dynamic equalizing filter. In this application light is coupled between the fundamental mode of the optical waveguide and a higher order mode that is subsequently lost.

Figure 8:
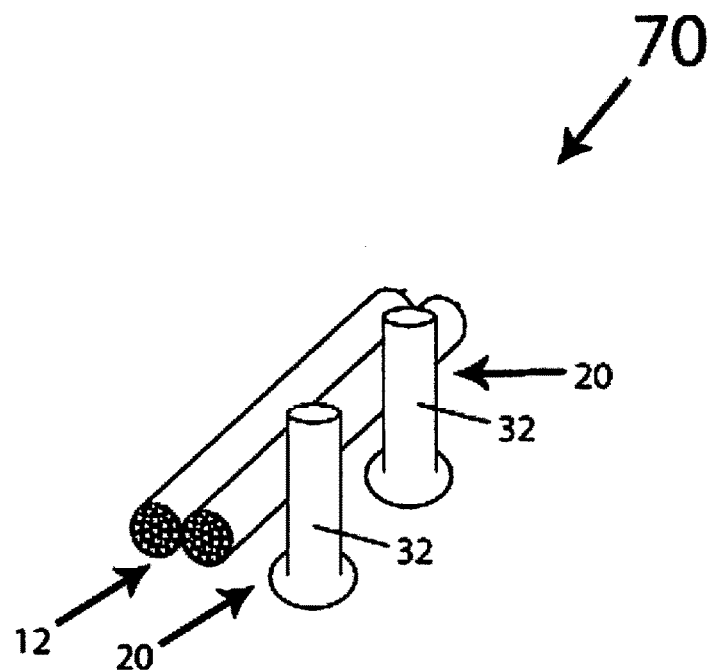
FIG. 8 is a perspective view of an alternative embodiment of the optical signal processor shown in FIGS. 1-5, with positioning elements of an actuator system of the optical signal processor in a non-energized, un-deflected state.

FIG. 8 depicts an alternative embodiment of the optical signal processor 14 in the form of an optical signal processor 70, in which the contact portions 32 of the positioning elements 20 are fixed to the adjacent optical waveguide 12 by a suitable means such as fusing, or an adhesive that is compatible with the optical waveguide 12. Because the contact portions 32 are fixed to the optical waveguide 12, each positioning element 20 can both push and pull the optical waveguide 12, thereby negating any need for a second set of contact portions 32 located on the other side of the optical waveguide 12, and halving the number of contact portions 32 for a given application. Each positioning element 20 can be deflected in a desired direction so as to push or pull the optical waveguide 12, by setting the polarity of the voltage across the positioning element 20 to induce bending of the positioning element 20 in the desired direction.

Figure 9:
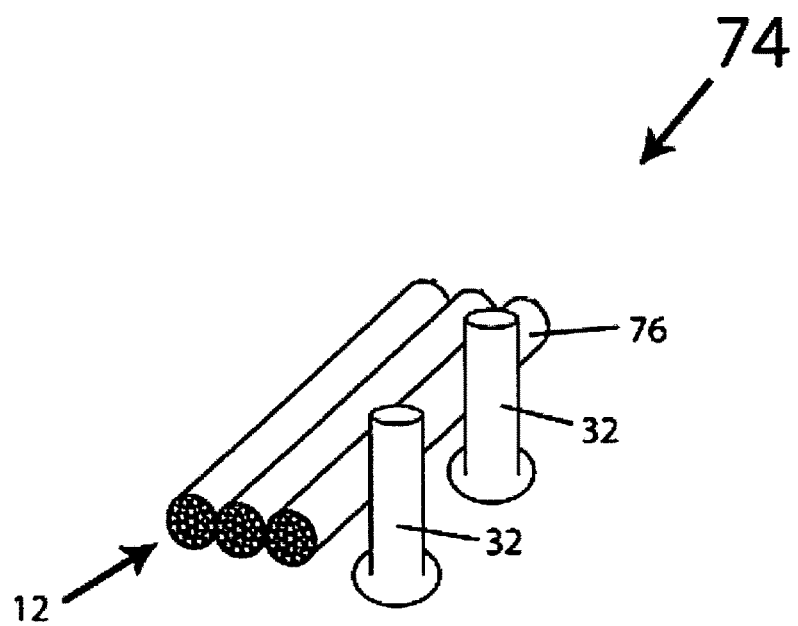
FIG. 9 is a perspective view of another alternative embodiment of the optical signal processor shown in FIGS. 1-5, with the positioning elements in a non-energized, un-deflected state.

FIG. 9 depicts another alternative embodiment in the form of an optical signal processor 74. The optical signal processor 74 is substantially the same as the optical signal processor 70, with the exception that the contact portions 32 of the positioning elements 20 are separated from the optical waveguide 12 by an auxiliary member 76. This configuration can be used, for example, where the index of refraction of the optical waveguide 12 is relatively low, and fixing the optical waveguide 12 directly to the contact portions 32 of the positioning elements 20 would result in a relatively high loss of optical power. Instead, the contact portions 32 can be fixed to the auxiliary member 76, which can be formed from a material having a sufficiently low index of refraction to prevent the optical modes propagating in the optical waveguide 12 from penetrating into the auxiliary member 76. Because the auxiliary member 76 has a lower index of refraction than the optical waveguide 12, contact between the optical waveguide 12 and the auxiliary member 76 will not result in power losses in the optical signal that could otherwise occur due to contact between the optical waveguide 12 and a material having a higher index of refraction.

Figure 10:
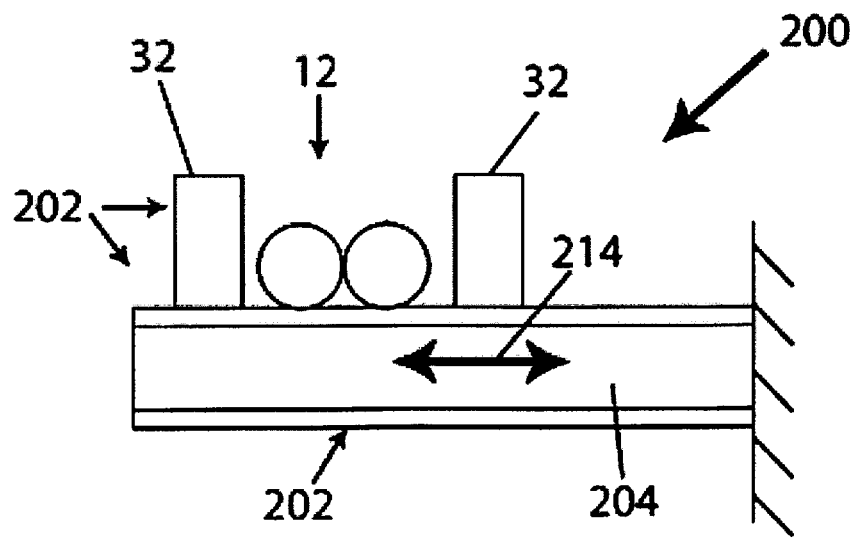
FIG. 10 is a side view of another alternative embodiment of the optical signal processor shown in FIGS. 1-5, with positioning elements of an actuator system of the optical signal processor in a non-energized, un-deflected state.
Figure 11:
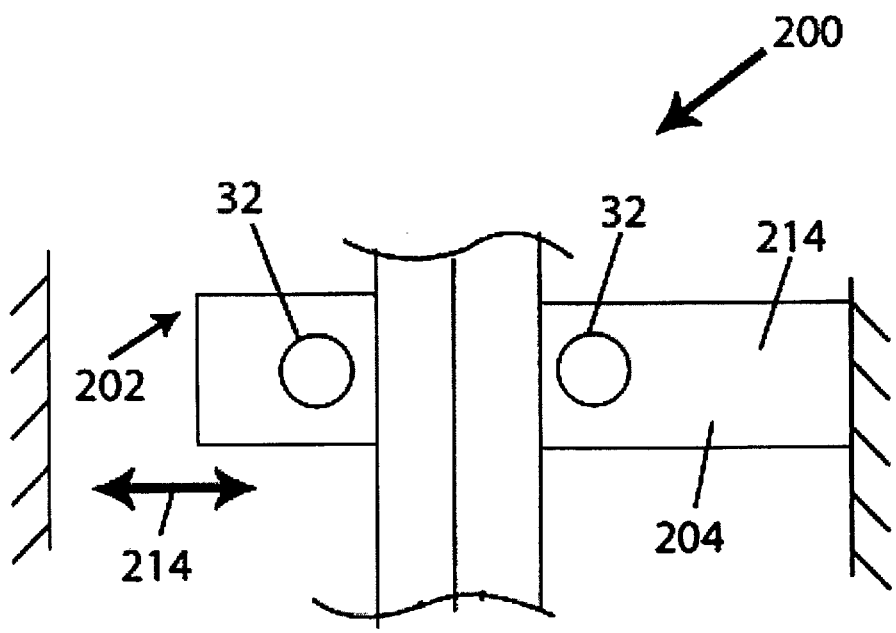
FIG. 11 is a top view of the optical signal processor shown in FIG. 10, with the positioning elements in the non-energized, un-deflected state.

FIGS. 10 and 11 depict another alternative embodiment in the form of an optical signal processor 200 comprising an optical waveguide 12, and an actuator system comprising a plurality of positioning elements 202. Only one of the positioning elements 202 is depicted in FIGS. 10 and 11, for clarity of illustration.

Each positioning element 202 is disposed in a substantially horizontal orientation, as shown in FIG. 10. The positioning elements 202 can each include a 31-mode piezoelectric actuator 204, i.e., a piezoelectric actuator comprising a layer of piezoelectric material having a $d_{31}$ piezoelectric coefficient, sandwiched between first and second layers of metallic material that act as electrodes when the positioning element 202 is energized. The first and second layers can be electrically connected to opposite poles of the voltage source 38.

Each positioning element 202 also includes a contact portion such as the contact portion 32 described above in relation to the positioning elements 20. A lower end of the contact portion 32 can be securely embedded in the associated piezoelectric actuator 204 proximate a first end thereof, by a suitable means such as an interference fit or adhesive. A second end of the piezoelectric actuator 204 can be fixed in relation to the optical waveguide 12.

Each piezoelectric actuator 204, when subjected to a potential from the voltage source 38, contracts or expands along its longitudinal axis in an amount proportional to the potential, as denoted by the arrows 214 in FIGS. 10 and 11. Movement of the piezoelectric actuator 204 causes the contact portion 32 of the positioning element 202 to contact the adjacent portion of the optical waveguide 12, and to pull the adjacent portion in the direction in which the piezoelectric actuator 204 is moving, as denoted by the arrows 214. Microbends can be imposed on the optical waveguide 12 by pulling localized portions of the optical waveguide 12 in opposite directions using the positioning elements 202. The controller 40 can be configured to control the voltage supplied to the piezoelectric actuator 204 of each positioning element 202 so as to impose a series of microbends in the optical waveguide 12 which result in a desired spectral response in the switch 200, as discussed above in relation to the optical signal processor 14.

Figure 12:
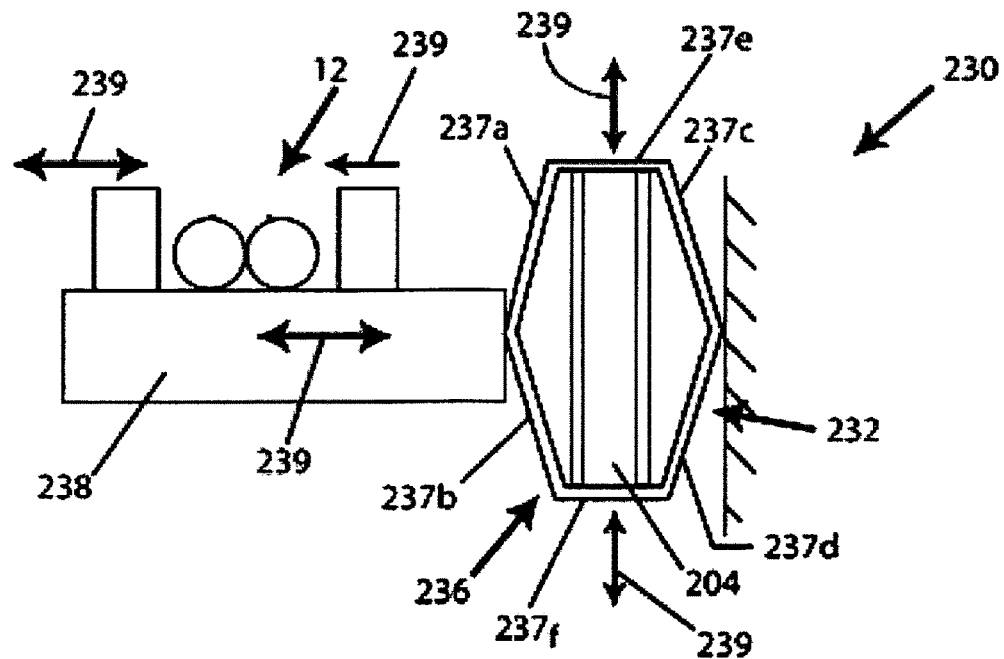
FIG. 12 is a side view of another alternative embodiment of the optical signal processor shown in FIGS. 1-5, with positioning elements of an actuator system of the optical signal processor in a non-energized, un-deflected state.
Figure 13:
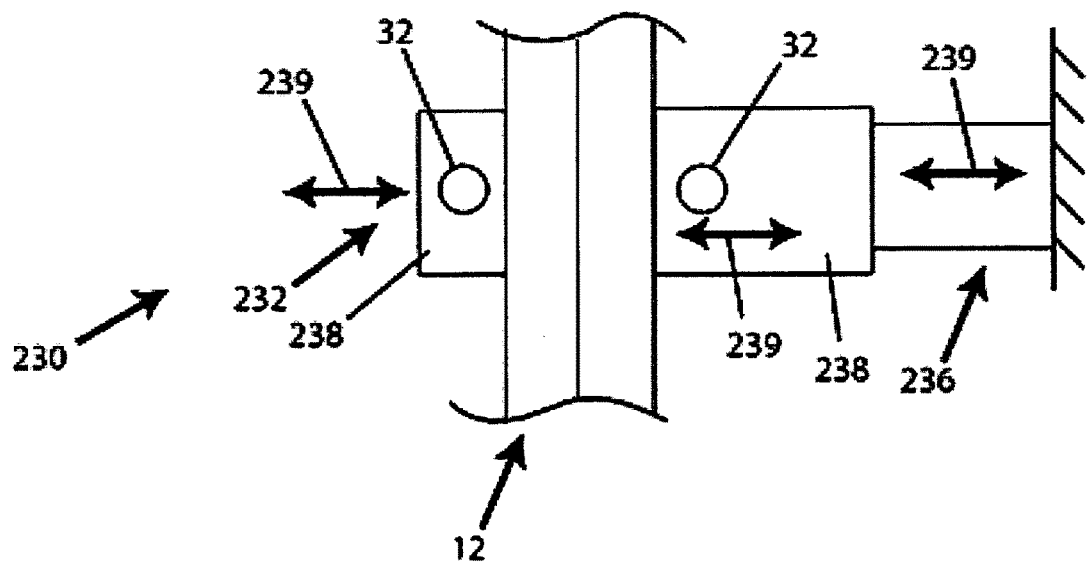
FIG. 13 is a top view of the optical signal processor shown in FIG. 12, with the positioning elements in the non-energized, un-deflected state.

FIGS. 12 and 13 depict a variant of the optical signal processor 200 in the form of an optical signal processor 230 comprising an optical waveguide 12, and an actuator system comprising a plurality of positioning elements 232. Only one of the positioning elements 232 is depicted in FIGS. 12 and 13, for clarity of illustration.

Each positioning element 232 can include a piezoelectric actuator such as the piezoelectric actuator 204 of the optical signal processor 200, and an enclosure 236 within which the piezoelectric actuator 204 is mounted. The enclosure 236 has six sides or facets. The facets are formed from a rigid or semi-rigid material, and are joined to each other in a manner that permits the facets to pivot in relation to each other. Each positioning element 232 can further include a carrier 238, and a contact portion 32 mounted in the carrier 238 by a suitable means such as an interference fit or adhesive.

The carrier 238 is fixed to two of the facets, designated 237a, 237b, that extend substantially in the vertical direction, by a suitable means such as a pin or other type of fastener. The other two facets that extend substantially in the vertical direction, designated 237c, 237d, are fixed to a static support by a suitable means such as a pin or other type of fastener.

Opposite ends of the piezoelectric actuator 204 can be fixed to the horizontally-oriented facets, i.e., the top and bottom facets, designated 237e, 237f, so that the piezoelectric actuator 204 has a substantially vertical orientation. Contraction of the piezoelectric actuator 204 in response to being energized by the voltage source 38 pulls the facets 237e, 237f toward each other, as denoted by the arrows 239 in FIGS. 12 and 13. Movement of the facets 237e, 237f toward each other pushes the facets 237a, 237b outwardly, as denoted by the arrows 239, which in turn pushes the contacting element 32 and the adjacent portion of the optical waveguide 12 outwardly. The geometric configuration of the enclosure 236 amplifies the movement of the piezoelectric actuator 204, so that the carrier 238 and the associated contact portion 32 move outwardly by a distance that is greater than the distance by which the piezoelectric actuator 204 contracts. It should be noted other means for achieving displacement amplification can be used in alternative embodiments, such as class 1 or class 3 levers, hydraulics, pneumatics, inclined planes, screws, etc.

Figure 14:
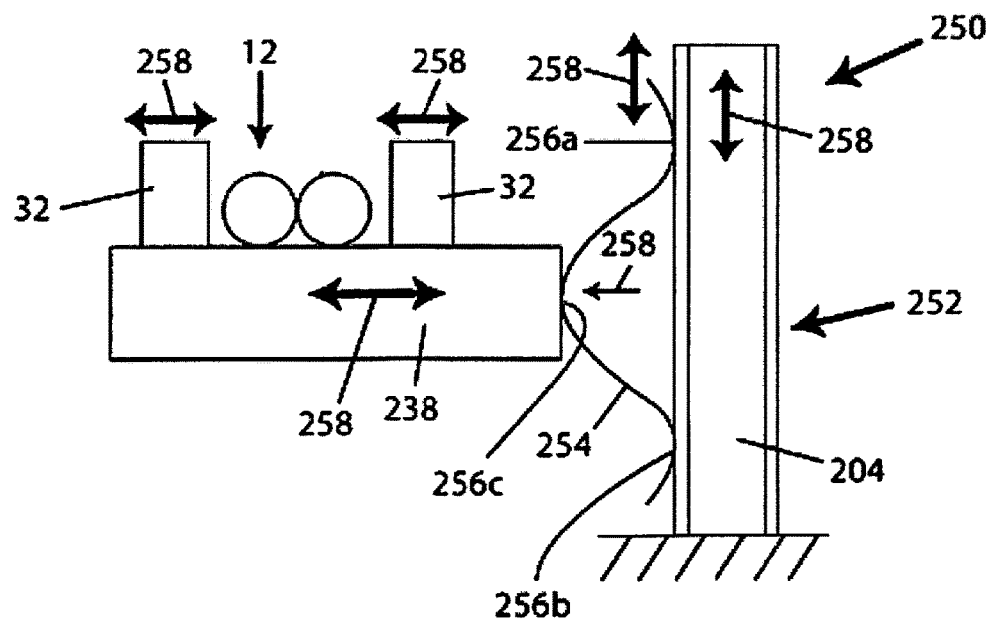
FIG. 14 is a side view of another alternative embodiment of the optical signal processor shown in FIGS. 1-5, with positioning elements of an actuator system of the optical signal processor in a non-energized, un-deflected state.
Figure 15:
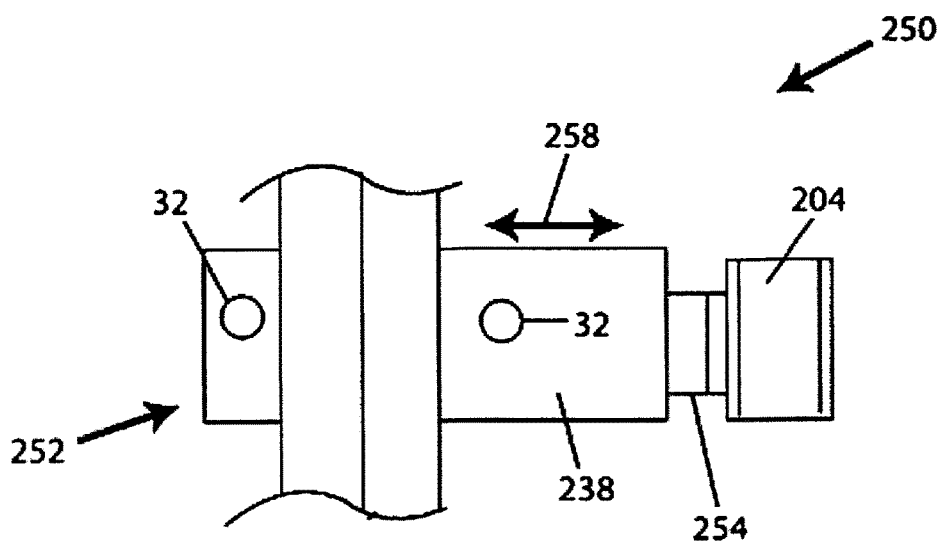
FIG. 15 is a top view of the optical signal processor shown in FIG. 14, with the positioning elements in the non-energized, un-deflected state.

FIGS. 14 and 15 depict a variant of the optical signal processors 200, 230 in the form of an optical signal processor 250 comprising an optical waveguide 12 and an actuator system comprising a plurality of positioning elements 252. Only one of the positioning elements 252 is depicted in FIGS. 14 and 15, for clarity of illustration.

Each positioning element 252 can include a piezoelectric actuator such as the piezoelectric actuator 204, a substantially C-shaped clip 254, a carrier 238, and a contact portion 32 are mounted in the carrier 238 by a suitable means such as an interference fit or adhesive. End portions 256a, 256b of the clip 254 can be fixed to the piezoelectric actuator 204 by a suitable means such as adhesive or fasteners. A middle portion 256c of the clip 254 can be fixed to the carrier 238 by a suitable means such as a pin or other type of fastener. One end of the piezoelectric actuator 204 can be fixed in relation to the optical waveguide 12.

Contraction of the piezoelectric actuator 204 in response to being energized by the voltage source 38 pulls the end portions 256a, 256b of the clip 254 toward each other, as denoted by the arrows 258 in FIGS. 14 and 15. Movement of the end portions 256a, 256b toward each other pushes the middle portion 256c outwardly, in the direction denoted by the arrows 258, which in turn pushes the contacting element 32 and the adjacent portion of the optical waveguide 12 outwardly. The geometric configuration of the clip 254 amplifies the movement of the piezoelectric actuator 204, so that the carrier 238 and the contact portion 32 move outwardly by a distance that is greater than the distance by which the piezoelectric actuator 204 contracts.

Figure 16:
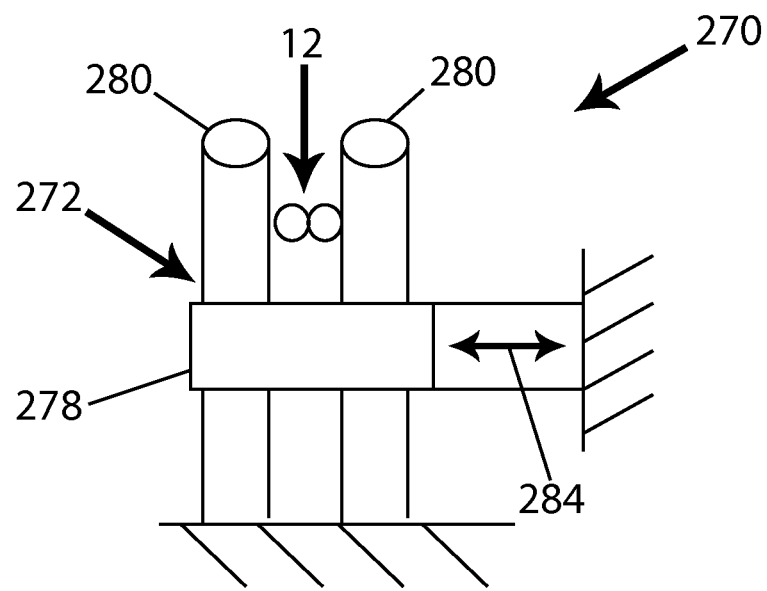
FIG. 16 is a side view of another alternative embodiment of the optical signal processor shown in FIGS. 1-5, with a positioning element of an actuator system of the optical signal processor in a non-energized, un-deflected state.
Figure 17:
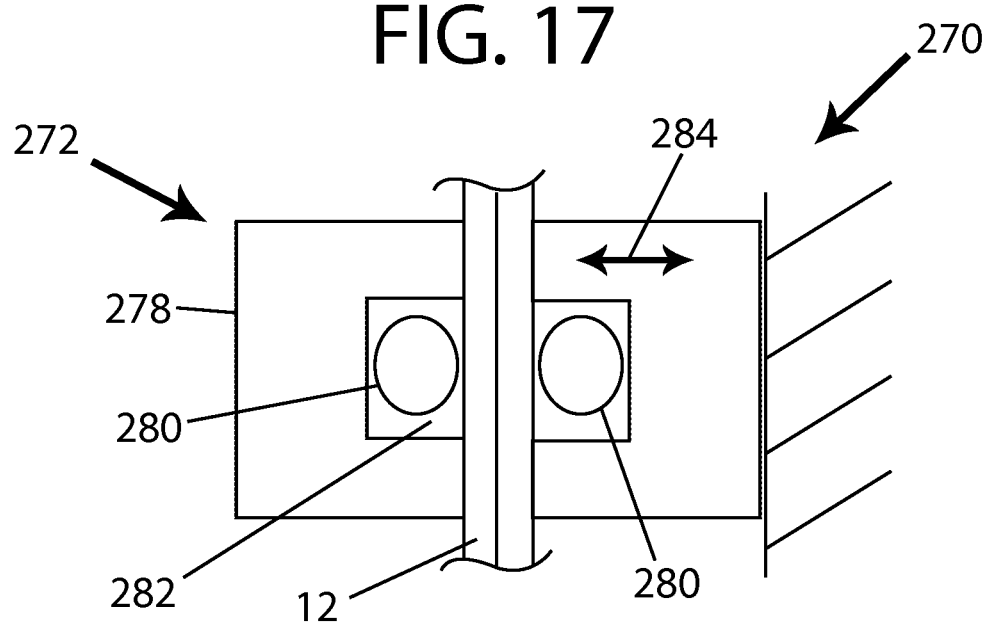
FIG. 17 is a top view of the optical signal processor shown in FIG. 16, with the positioning element in the non-energized, un-deflected state.

FIGS. 16 and 17 depict another variant of the optical signal processor 200 in the form of an optical signal processor 270 comprising an optical waveguide 12, and an actuator system comprising a plurality of positioning elements 272. Only one of the positioning elements 272 is depicted in FIGS. 16 and 17, for clarity of illustration.

Each positioning element 272 can include a piezoelectric actuator 278, and two contact portions 280. The piezoelectric actuators 278 and the contact portions 280 are substantially the same as the respective piezoelectric actuators 204 and contact portions 32 of the optical signal processor 200, with the exceptions noted below.

One end of the piezoelectric actuator 278 is fixed, and other end is unrestrained as depicted in FIGS. 16 and 17. Both of the contact portions 280 of each positioning element 272 are elongated, and extend through a single rectangular hole 282 formed in the piezoelectric actuator 278. An end of each contact portion 280 is fixed to a location below its associated piezoelectric actuator 278, and the other end of the contact portion 280 is unrestrained, as shown in FIG. 16. The piezoelectric actuator 278, when subjected to a potential from the voltage source 38, contracts or expands along its longitudinal axis in an amount proportional to the potential, as denoted by the arrows 284 in FIGS. 16 and 17. Movement of the piezoelectric actuator 278 in one direction causes one of the contact portions 280 to pull the adjacent portion of the optical waveguide 12 in that direction. Movement of the piezoelectric actuator 278 in the opposite direction causes the other contact portion 280 to pull the adjacent portion of the optical waveguide 12 in the opposite direction.

Figure 18:
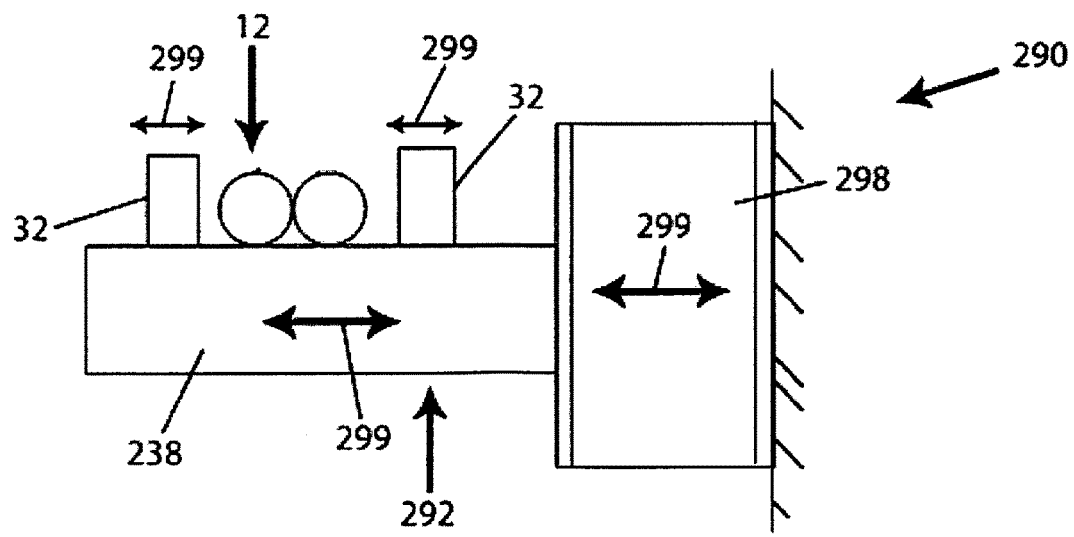
FIG. 18 is a side view of another alternative embodiment of the optical signal processor shown in FIGS. 1-5, with positioning elements of an actuator system of the optical signal processor in a non-energized, un-deflected state.
Figure 19:
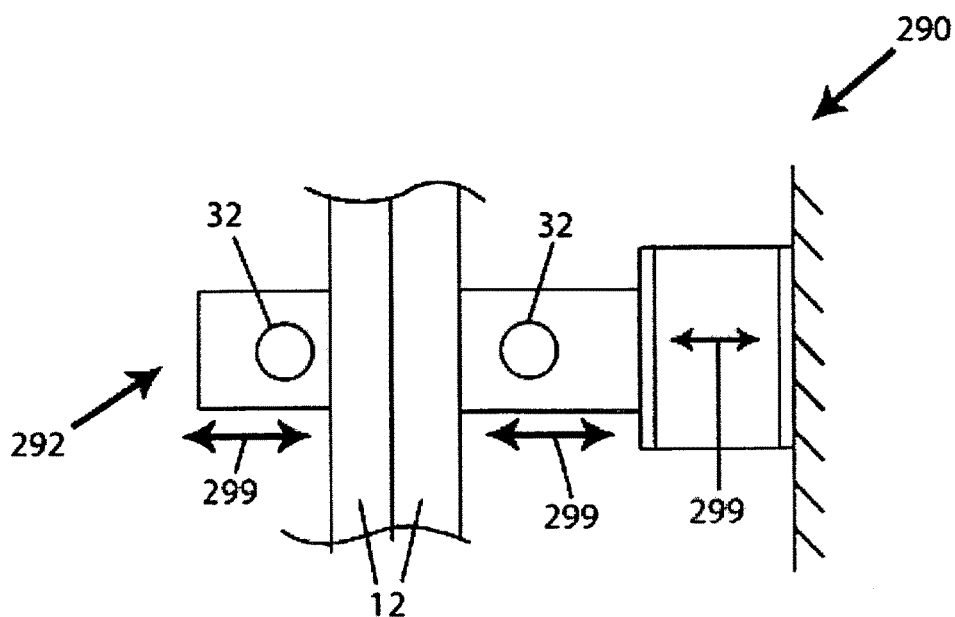
FIG. 19 is a top view of the optical signal processor shown in FIG. 18, with the positioning elements in the non-energized, un-deflected state.

FIGS. 18 and 19 depict another variant of the optical signal processor 200 in the form of an optical signal processor 290 comprising an optical waveguide 12, and an actuator system comprising a plurality of positioning elements 292. Only one of the positioning elements 292 is depicted in FIGS. 18 and 19, for clarity of illustration.

Each positioning element 292 can include a piezoelectric actuator 298, a carrier 238, and a contact portion 32 mounted in the carrier 238 by a suitable means such as an interference fit or adhesive. An end of the carrier 238 can be fixed to the outwardly-facing electrode of the associated piezoelectric actuator 298 as shown in FIGS. 18 and 19, by a suitable means such as adhesive.

The piezoelectric actuators 298 are 33-mode piezoelectric actuators, i.e., each piezoelectric actuator 298 comprises a layer of piezoelectric material having a $d_{33}$ piezoelectric coefficient. Because the piezoelectric actuators 298 are 33-mode piezoelectric actuators, the piezoelectric actuators 298 contract in a direction parallel to the direction of the voltage applied thereto. Thus, the piezoelectric actuators 298 are oriented vertically as shown in FIG. 18, so that the contraction thereof pulls the carrier 238 and the adjacent portion of the optical waveguide 12 inwardly, as denoted by the arrows 299 in FIGS. 18 and 19.

Figure 20:
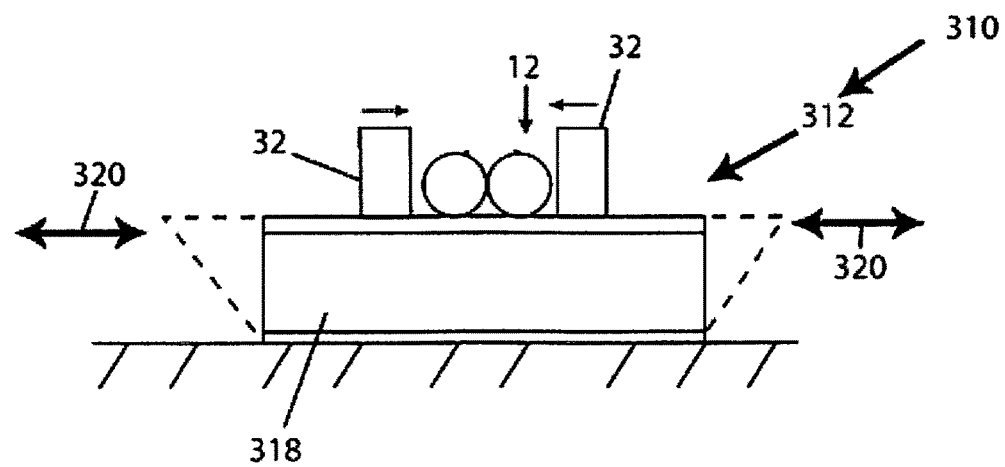
FIG. 20 is a side view of another alternative embodiment of the optical signal processor shown in FIGS. 1-5, with positioning elements of an actuator system of the optical signal processor in a non-energized, un-deflected state.
Figure 21:
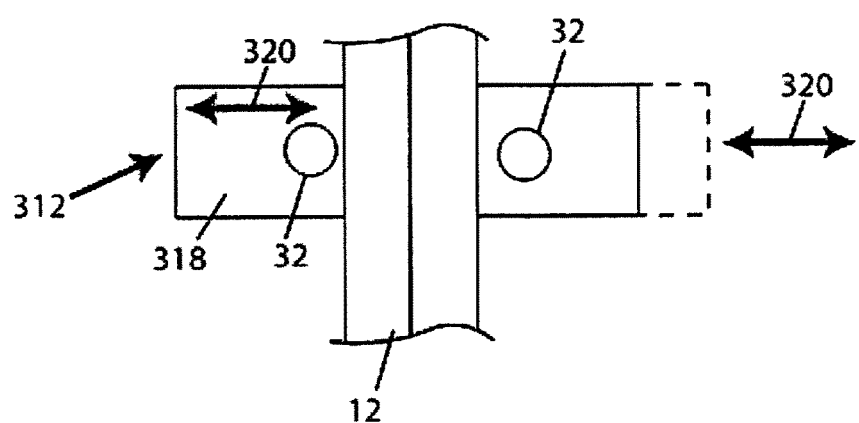
FIG. 21 is a top view of the optical signal processor shown in FIG. 20, with the positioning elements in the non-energized, un-deflected state.

FIGS. 20 and 21 depict another variant of the optical signal processor 200 in the form of a optical signal processor 310 comprising a optical waveguide 12, and an actuator system comprising a plurality of positioning elements 312. Only one of the positioning elements 312 is depicted in FIGS. 20 and 21, for clarity of illustration.

Each positioning element 312 can include a piezoelectric actuator 318, and a contact portion 32. A bottom of the positioning element 312 can be fixed in relation to the optical waveguide 12 as shown in FIG. 20, by a suitable means such as adhesive.

The piezoelectric actuators 318 are 15-mode piezoelectric actuators, i.e., each piezoelectric actuator 318 comprises a layer of piezoelectric material having a $d_{15}$ piezoelectric coefficient. Because the piezoelectric actuators 318 are 15-mode piezoelectric actuators, the piezoelectric actuators 318 experience a shear strain when subjected to a potential. This shear strain causes the top portion of each piezoelectric actuator 318, the associated contact portion 32, and the adjacent portion of the optical waveguide 12 to deflect in a substantially horizontal direction, as denoted by the arrows 320 and as depicted in phantom in FIGS. 20 and 21.

Figure 22:
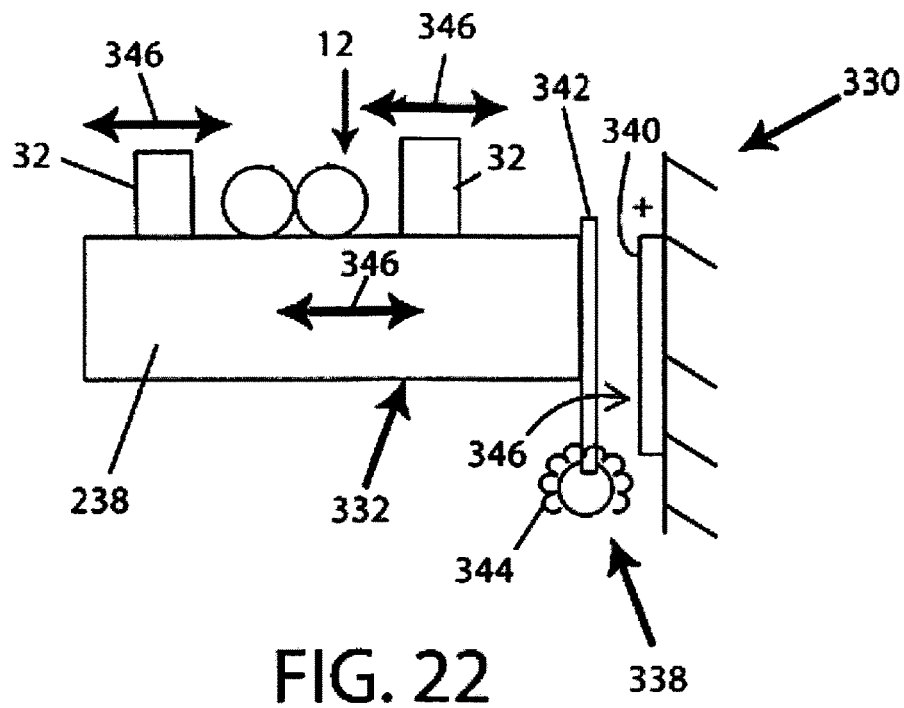
FIG. 22 is a side view of another alternative embodiment of the optical signal processor shown in FIGS. 1-5, with positioning elements of an actuator system of the optical signal processor in a non-energized, un-deflected state.
Figure 23:
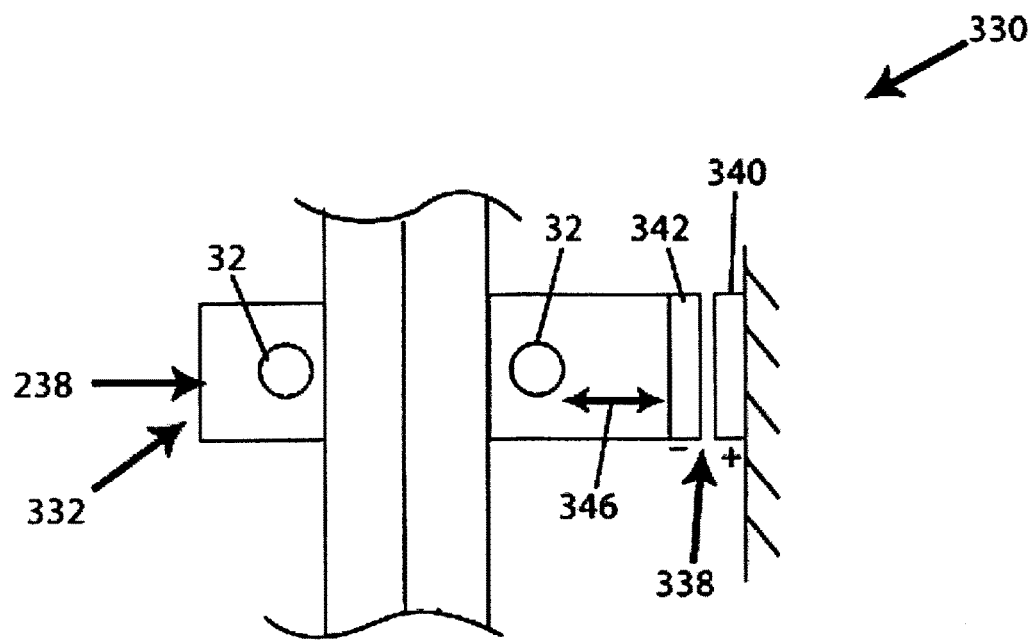
FIG. 23 is a top view of the optical signal processor shown in FIG. 22, with the positioning elements in the non-energized, un-deflected state.

FIGS. 22 and 23 depict another variant of the optical signal processor 200 in the form of a optical signal processor 330 comprising an optical waveguide 12, and an actuator system comprising a plurality of positioning elements 332. Only one of the positioning elements 332 is depicted in FIGS. 22 and 23, for clarity of illustration.

Each positioning element 332 can include an electrostatic relay 338, a carrier 238, and a contact portion 32 mounted in the carrier 238 by a suitable means such as an interference fit or adhesive.

A positive pole 340 of each electrostatic relay 338 can be fixed in relation to the optical waveguide 12, as shown in FIGS. 22 and 23. A negative pole 342 of the relay 238 can be fixed to the associated carrier 238 by a suitable means such as adhesive, and can be biased away from the positive pole 340 by a spring 344.

The poles 340, 342 of the relay 238 can be electrically connected to the voltage source 38. The negative pole 342 of the relay 338 deflects inwardly against its spring bias and toward the positive pole 340, as denoted by the arrows 346 in FIGS. 22 and 23, in response to the electric field generated when the relay 338 is energized. The inward movement of the negative pole 342 moves the associated carrier 238, contact portion 32, and adjacent portion of the optical waveguide 12 inwardly in a corresponding manner.

We claim:

1. A system for processing an optical signal, comprising:
   an optical waveguide;
   a voltage source;
   a deflector device electrically connected to the voltage source and responsive to a voltage applied thereto by the voltage source so as to statically deflect the waveguide, the deflector device comprising at least one first positioning element including
   two contact portions between which the optical waveguide is disposed, and
   a single elongate piezoelectric actuator to which the two contact portions are fixedly coupled, where a free end of the single elongate piezoelectric actuator bends in a first direction perpendicular to a longitudinal axis of the single elongate piezoelectric actuator when a first electric field is applied thereto and bends in a second direction opposed to the first direction when a second electric field is applied thereto; and
   a controller communicatively coupled to the voltage source and controlling the voltage supplied to the deflector device.

2. The system of claim 1, wherein the deflector device comprises a plurality of second positioning elements, each positioning element of the plurality of second positioning elements including an actuator that is operative to deflect the optical waveguide in a direction and by an amount in response to a voltage applied to the positioning element.

3. The system of claim 2, wherein each of the plurality of second positioning elements further comprises a contact portion fixedly coupled to the actuator, the contact portion being operative to deflect the optical waveguide in a direction and by an amount in response to the deflection of the actuator.

4. The system of claim 1, wherein the controller is operative to control the voltage supplied to the deflector device so that the deflector device induces a series of static bends of variable period and amplitude in the optical waveguide, the static bends modifying spectral characteristics of the optical signal.

5. The system of claim 4, wherein the static bends modify spectral characteristics of the optical signal by coupling propagation modes within the optical waveguide.

6. The system of claim 2, wherein the actuator of the positioning element operates to statically deflect a first portion of the optical waveguide in a third direction, and actuators of two other positioning elements of the plurality of second positioning elements operate to statically deflect respective second and third portions of the optical waveguide in a fourth direction substantially opposite the third direction thereby forming a bend in the optical waveguide.

7. The system of claim 6, wherein the actuator of the positioning element is located on one side of the optical waveguide and the actuators of the other two positioning elements are located on a second side of the optical waveguide.

8. The system of claim 6, wherein the actuators of the positioning elements are located on one side of the optical waveguide and are fixedly coupled to the optical waveguide.

9. The system of claim 8, wherein the actuators of the positioning elements are fixedly coupled to the optical waveguide through a member that does not propagate light.

10. A system for processing an optical signal, comprising:
    an optical waveguide;
    a voltage source;
    a deflector device configured to statically deflect the waveguide, the deflector device being electrically connected to the voltage source and responsive to a voltage applied thereto by the voltage source; and
 a controller communicatively coupled to the voltage source and being operative to control the voltage supplied to the deflector device;
 wherein the controller is operative to control the voltage supplied to the deflector device so that the deflector device induces a series of static bends of variable period and amplitude in the waveguide, the static bends modifying spectral characteristics of the optical signal;
 wherein the optical waveguide is a fused fiber optic coupler.

11. The system of claim 10, wherein the static bends modify a pass band of the fused fiber optic coupler.

12. The system of claim 1, wherein the controller is operative to control the voltage supplied to each of a plurality of actuators on an individual basis.

13. An actuator system for use with an optical waveguide, comprising:
 a voltage source;
 a plurality of positioning elements electrically connected to the voltage source, each of the positioning elements comprising
   two contact portions between which the optical waveguide is disposed,
   a single elongate piezoelectric actuator to which the two contact portions are fixedly coupled, where a free end of the single elongate piezoelectric actuator bends in a first direction perpendicular to a longitudinal axis of the single elongate piezoelectric actuator when a first electric field is applied thereto and bends in a second direction opposed to the first direction when a second electric field is applied thereto; and
 a controller communicatively coupled to the voltage source and operating to individually vary the voltage provided to each of the plurality of positioning elements to thereby control deflection of the optical waveguide by the contact portions.

14. The system of claim 13, wherein each of the plurality of positioning elements is operable to deflect the optical waveguide in one or more directions substantially perpendicular to a longitudinal axis of the optical waveguide.

15. The system of claim 13, wherein the single elongate piezoelectric actuator undergoes a deflection in response to a voltage provided thereto.

16. A system for modifying an optical signal, comprising:
 an optical waveguide transmitting the optical signal; and
 an actuator system comprising a plurality of positioning elements located proximate the optical waveguide and each comprising an actuator that operates to cause a static deflection in the optical waveguide, the deflection altering a spectral response of the optical waveguide;
 wherein the actuator comprises an elongate piezoelectric actuator to which two contact portions are fixedly coupled, where a free end of the elongate piezoelectric actuator bends in a first direction perpendicular to a longitudinal axis of the elongate piezoelectric actuator when a first electric field is applied thereto and bends in a second direction opposed from the first direction when a second electric field is applied thereto.

17. The system of claim 16, wherein each of the actuators is operable to statically deflect the optical waveguide in one or more directions substantially perpendicular to a longitudinal axis of the optical waveguide.

18. The system of claim 3, wherein the contact portion of each of the plurality of second positioning elements contacts either side of the optical waveguide in response to the deflection of the actuator.

19. The system of claim 3, wherein the contact portion of each of the plurality of second positioning elements is fixedly coupled to the optical waveguide.

20. The system of claim 3, wherein the contact portion of each of the plurality of second positioning elements is fixedly coupled to the optical waveguide via a member that does not propagate light.

* * * * *